United States Patent

Aucagne

[11] Patent Number: 5,238,728
[45] Date of Patent: Aug. 24, 1993

[54] DEFORMABLE TEXTILE STRUCTURE

[75] Inventor: Jean Aucagne, la Tour du Pin, France

[73] Assignee: Brochier S.A., Decines Cedex, France

[21] Appl. No.: 623,709

[22] PCT Filed: Apr. 17, 1990

[86] PCT No.: PCT/FR90/00280

§ 371 Date: Dec. 12, 1990

§ 102(e) Date: Dec. 12, 1990

[87] PCT Pub. No.: WO90/12911

PCT Pub. Date: Nov. 1, 1990

[30] Foreign Application Priority Data

Apr. 18, 1989 [FR] France ................ 89 05143

[51] Int. Cl.$^5$ ............................................. D03D 3/00
[52] U.S. Cl. ............................ 428/232; 428/212; 428/257; 428/294; 428/902; 428/225
[58] Field of Search ............ 428/105, 107, 108, 111, 428/212, 232, 257, 294, 902, 225

[56] References Cited

U.S. PATENT DOCUMENTS 4,379,798  4/1983  Palmer et al. .................. 428/113

FOREIGN PATENT DOCUMENTS

0056351  7/1982  European Pat. Off. .
0299309  7/1988  European Pat. Off. .
1068334  6/1954  France .
2593525  7/1987  France .

*Primary Examiner*—James J. Bell
*Attorney, Agent, or Firm*—Wenderoth, Lind & Ponack

[57] ABSTRACT

The invention relates to a textile structure comprising a superposition of unidirectional layers of yarns, the directions of which are crossed in relation to one another and which are tied by tying yarns. According to the invention, the number of superposed layers is at least equal to. The tying rate lies between 2 and 15%, approximately, and each tying yarn (20) ties at least one set of yarns of superposed layers, this set being defined by at least a first yarn (24) of a first layer (16) and at least a second yarn (25) of a second layer (19). The second yarn (25) is offset in relation to the first (24), and the connection of the layers is thus sufficiently loose in order to keep the structure in position and allow it to deform.

25 Claims, 4 Drawing Sheets

DEFORMABLE TEXTILE STRUCTURE

BACKGROUND OF THE INVENTION (1) Field of the Invention

The present invention relates to the field of textile structures and more specifically those which are adapted to the manufacture of composite materials. The invention relates more specifically to a textile structure which is capable of deformation and can thus be shaped in an advantageous manner at the time of a molding process for obtaining a final composite material.

(2) State of the Prior Art

It is known that composite materials are constituted by a textile reinforcement and by a resin matrix, this unit being made and shaped at the time of a molding process. It is not necessary to go over in detail the various techniques which can be used in practice for the manufacture of such composite materials because they are now well-known to one skilled in the art.

The manufacturers of composite materials are well aware that the shape of the final pieces to be obtained often raises technical problems which are difficult to solve. In fact, the textile reinforcement consequently has to be shaped either in advance or at the time of positioning in the mold. When it is a matter of manufacturing pieces of developable shape, the textile reinforcement elements can be prepared without major difficulty, except for allowing a good injection of resin into the mold before the polymerization which leads to the final composite material. The technical difficulties are therefore dependent upon the nature of the composite material itself and not upon its shape. In complete contrast, when it is necessary to manufacture non-developable pieces, use has to be made of separate elements of textile reinforcement, which it is therefore appropriate cut, position and to superpose so as to provide a reinforcement corresponding to the final shape desired. Any cut-out in a textile reinforcement introduces a discontinuity in the yarns and fibers thereof, which leads to regions of weakness in the piece made of the composite material. This is completely unacceptable for certain applications, for example in aeronautics. Moreover, the cutting-out operations are lengthy and costly The Patent FR-1 068 334 relates to a process for obtaining a fibrous material intended for the reinforcement of plastic materials. The aim of this patent is to make a network of a number of fabrics, imbricated with one another by a weaving operation.

The imbrication between the fabrics is obtained by warp yarns which pass periodically from one fabric to another.

The fibrous material obtained by this process makes it possible to limit the risks of cleavage which can exist when two adjacent layers of fabric are not connected to one another by a fibrous link.

However, precisely because of the imbrication between the fabrics, the fibrous material obtained is not deformable and therefore cannot be shaped in an advantageous manner.

Efforts are therefore currently being made to perfect textile structures which can be deformed so as to significantly reduce the implementation time, making it possible to manufacture a piece made of a composite material while avoiding cut-outs, the textile structure then being capable of being preformed in order to be adapted to the shape of the piece to be obtained.

It is this technical problem which provides the basis of the present invention. The invention affords a simple solution and produces very advantageous results in relation to the proposals of the prior art.

It has already been proposed to use, as textile reinforcements, fabrics of a somewhat loose texture, in such a manner that they give at the time of shaping. However, to the knowledge of the applicant, this solution has never led to satisfactory practical results because, if a structure is deformable, it does not, for all that, satisfy the other criteria which are necessary in order that it constitute a good textile reinforcement for composite materials.

By way of a simple example, the mats which are constituted by yarns and fibers distributed in a random manner are easily deformable but have very poor mechanical properties. Similarly, fabrics of the satin type are not suitable either. Despite a certain capacity for deformation, such a fabric forms creases if it is attempted to position it on a complex surface which has particularities. Thus, the presence of creases considerably weakens the mechanical properties of the piece made of the composite material.

It has already been proposed to use fabrics comprising yarns in one direction and, in the other direction, undulating yarns, this undulation being oriented in the plane of the fabric. Such a textile structure has the capacity of being deformed, at least in a direction parallel to the axis of the undulations. However, after deformation, the orientation of the fibers is fundamentally modified. Therefore does not allow the properties of composite materials which have been made and contain such structures as reinforcements to be anticipated. It is also known that fabrics exist which comprise undulating yarns, the undulations of which are perpendicular to the plane of the fabric. These fabrics are deformable, at least in the direction of the undulations, but they too do not provide an optimum orientation of the fibers when they are shaped in order to serve as a reinforcement in composite materials. As in the case of the undulations in the plane, but to a lesser degree, such fabrics are not suitable for high-performance composite materials.

It has further been proposed to use, as textile structures, fabrics obtained by oblique interlacings of yarns, so as to make somewhat loose structures, similar to lattices, of which the intervals separating the yarns have a shape similar to lozenges or parallelograms, having a certain capacity for deformation. However, these structures are very loose, and it is not possible to obtain fiber coverage rates in the textile reinforcement which are adequate in order to obtain good properties in the composite material. By fiber coverage rate is understood, in general, the ratio of the volume occupied by the fibers in relation to the volume of the textile surface.

Textile structures are also known which are obtained by superposing a certain number of fabrics or layers in which the yarns and fibers have a certain capacity for sliding in relation to one another. Thus there exist structures in which the fibers can, at the time of deformation, orient themselves in a direction which is generally parallel to that of the plane of the structure as a whole. This structure of a multi-directional type is also not suitable as a reinforcement for composite materials, because when it is used to make pieces which have sharp angles, the sliding of the fabrics leads to a perforation of the fabric which is, of course, unacceptable.

Lastly, it has already been proposed to use superposed fabrics or layers, generally two in number, or at most three, which are kept in position by very loose tying so as to allow a sliding of the yarns and fibers parallel to the plane of the structure as a whole, so that, at the time of shaping on a curved surface, the yarns essentially follow the contour of the shape. Although the general concept of this solution appears good, it has not given rise, thus far, to a satisfactory practical embodiment, above all because of poor performances obtained upon use as textile reinforcement. Thus, the deformability can be obtained in a satisfactory manner, but the performances of the structure in the dry state, and above all after shaping and impregnation, are not adequate for the requirements of reinforcements for high-performance composite materials.

In order to clarify these ideas, if an arbitrary scale is adopted in order to evaluate performance after impregnation of the structure, and by attributing the value 10 to a mat, as far as mechanical performances are concerned, a value close to 12 can be estimated for the results provided by a structure with fabric comprising undulations in the plane, a value of around 14-15 for fabrics with undulation perpendicular to their plane and likewise for lattice-type fabrics. As far as fabrics are concerned which allow a parallel sliding of the fibers, it is not currently possible to reconcile at the same time a good aptitude for deformation and adequate mechanical performances. Although, by adopting the above-mentioned arbitrary scale, such fabrics make it possible to achieve values of 18-20, they are then no longer sufficiently deformable. Conversely, when, with a sufficiently loose tying, an adequate deformability is obtained, the mechanical performances do not exceed a value of 14-15, as in the case of a lattice-type fabric.

SUMMARY OF THE INVENTION

The present invention starts from the abovementioned prior art in order to create a textile structure which is capable of, at the same time, having a high aptitude for deformation and providing good mechanical performance when used as a textile reinforcement for composite materials. At the same time, the textile structure can be made and obtained at a low cost.

Another object of the invention is a textile structure which can be made while maintaining an essentially constant and uniform fiber content in the textile reinforcement once shaped and in the final piece made of the composite material, inasmuch as the fiber content can be provided for in advance by varying it as required in given regions of the structure, which it is known will correspond to given parts of the final piece to be obtained. In particular, it is possible to provide that the fiber content is relatively higher in those parts of the fabric corresponding to those parts of the piece involving relatively greater deformations in such a manner that the fiber content is essentially homogeneous and constant in the final piece made of a composite material.

The subject of the invention is a textile structure comprising a superposition of unidirectional layers of yarns, the directions of which are crossed in relation to one another and which are tied by tying yarns, the structure being characterized in that the number of superposed layers is at least equal to three, in that the tying rate lies between 2 and 15% approximately and in that each tying yarn ties at least one set of yarns of superposed layers, defined by at least a first yarn of a first layer and at least a second yarn of a second layer, the second yarn being offset in relation to the first, the connection of the layers thus being sufficiently loose in order to keep the structure in position and allow it to deform.

According to the invention, the expression "superposition of layers" means that the layers are placed on top of one another, without shrinking of the warp.

According to the invention, the expression "tying rate" designates the ratio of the mass of tying yarns to the mass of yarns of the structure.

According to the invention, the expression "the tying yarn ties a set of yarns" means that the tying yarn surrounds this set without passing through the latter.

According to a particular embodiment of the invention, the yarns in the same direction are distributed in essentially superposed rows, each tying yarn tying at least certain of the yarns of one row at the same time as at least certain yarns of at least one adjacent row.

According to the invention, the phrase according to which "the tying yarn ties two adjacent rows of yarns" means that the tying yarn partially surrounds these two rows, without passing between them according to an orientation which is substantially orthogonal to the layers of yarns.

According to a preferred embodiment of the invention, the layers are parallel with one another.

According to another preferred embodiment of the invention, the direction of the yarns of one layer forms an angle of 90° approximately with that of the adjacent layers.

For the requirements of the invention, technical yarns and fibers are used which are suitable for the textile reinforcements used in the manufacture of composite materials. The structure can thus comprise layers formed of metal, glass, carbon, silicon carbide, boron, aramid yarns and fibers and other similar technical fibers. The yarns constituting the layers can be of a thermoplastic nature or associated with a thermoplastic resin, in particular by coating, intimate mixing or preimpregnation. Inside one and the same textile structure, it is possible to find layers of different natures as well as one or more layers of a hybrid nature. Optimum results have been achieved with glass fibers.

It has been indicated above that the number of superposed unidirectional layers was at least equal to three. The requirements of the invention are satisfied with structures consisting of relatively thick fabrics, in order to impart good mechanical strength to the whole, while being deformable.

The unit weight of the textile structure in the dry state, that is to say without preimpregnation resin, is comprised, for example, between 300 and 1000 g/m² approximately and preferably between 400 and 600 g/m² approximately, the lowest surface unit weights being reserved for aeronautical uses, whereas the highest values of the range, which correspond to heavier fabrics, can be used for less costly applications.

One of the essential characteristics of the invention is the presence of tying yarns in a number and in an orientation which are well defined. Thus, for example, known structures which are known as "tridimensional", such as those described in the Patent Application EP-0 056 351, comprise unidirectional layers of yarns, the directions of which are crossed in relation to one another, the yarns of the layers in the same direction being distributed in substantially superposed rows. The layers are tied by tying yarns, the orientation of which is substantially perpendicular to the layers and which are arranged between two adjacent rows of yarn of the superposed layers. In contrast to these structures, in which the tying rate is high, and situated, for example, between 15 and 20%, the value of the tying rate in the structure of the invention is situated between 2 and 15% approximately, so as to constitute a loose structure which is capable of deformation. Apart from this condition with regard to the tying rate, it is also necessary that the tying yarns have certain orientations, so as not to enclose successively all the yarns of the rows of superposed layers, passing from one row to the adjacent row.

In the structure according to the invention, the tying yarns can tie all the yarns of a row but, at the same time, they also tie at least certain yarns of at least one adjacent row. Examples of this will be given below. The orientation of the tying yarns in relation to the superposed layers can be substantially orthogonal to the latter or, on the other hand, the tying yarns can extend obliquely in order to tie successively a certain number of yarns in adjacent rows. Illustrations of this embodiment will also be indicated below.

Use is in general made of tying yarns of finer diameter than the yarns constituting the layers. In fact, the role of the tying yarns is solely to keep the structure in position, constituting a sort of frame. In this regard, the tying yarns can be made in any manner, of natural or artificial fibers. They can be yarns which remain permanently in the final composite material or, on the other hand, they can be heat-meltable yarns which disappear at the time of manufacture of the piece made of composite material. The tying yarns can also be of thermoplastic nature or associated with a thermoplastic resin, in particular by coating, intimate mixing or preimpregnation. In general, however, fine yarns are preferred, which make it possible to satisfy better the requirements of weight and of mechanical characteristics of the final structure.

The advantages provided by the invention are illustrated by a certain number of tests which show that the structures have at the same time a high aptitude for deformation, while imparting good mechanical properties to the textile reinforcement of the composite material, at a low cost, with a distribution of fibers within the piece such that neither perforations at in sharp angles, if the piece to be manufactured has these, nor creases or undulations have been observed, and this distribution of fibers being substantially homogeneous and constant.

The textile structure according to the invention can be used after having been impregnated with resin, in particular thermosetting resin.

From another angle, the subject of the invention is also the final composite pieces comprising at least one textile structure of the type described above.

BRIEF DESCRIPTION OF THE DRAWINGS

The invention will be better understood and other object advantages and characteristics of the latter will appear more clearly from reading the description which follows of embodiments of the invention, which are given non-limitatively, and to which drawings are attached, in which.

DETAILED DESCRIPTION OF THE PREFERRED EMBODIMENTS

The elements common to the different figures are designated by the same reference characters.

Figure 1:
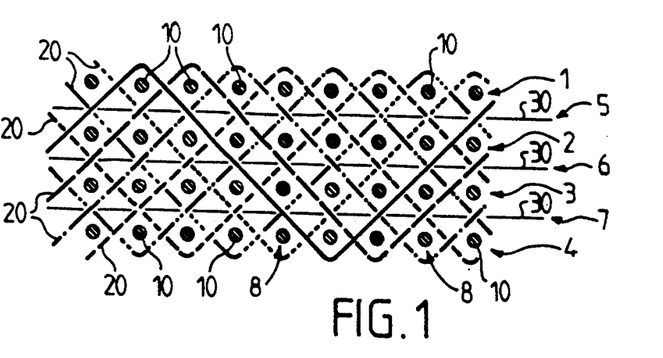
FIG. 1 is a schematic view in cross-section according to the warp yarns of a first example of a textile structure according to the invention.

FIG. 1 shows a textile structure comprising four layers 1 to 4 of weft yarns 10 and three layers 5 to 7 of warp yarns 30 arranged alternately, the yarns all having the same direction within one and the same layer.

It can be noted that the yarns have substantially the same direction from one layer to another of the same nature (warp or weft). The layers are arranged in such a manner that the direction of a layer is crossed in relation to that of the adjacent layers. In this case, the directions of two adjacent layers are substantially at 90° to one another.

The layers are furthermore arranged in such a manner that the yarns in the same direction are distributed in rows 8 substantially perpendicular to the plane of the layers.

The stacked layers of the textile structure are tied by tying yarns 20. The method of tying is of the 7/1 twill type. The tying yarns are represented in a different manner in order to distinguish them.

Figure 2:
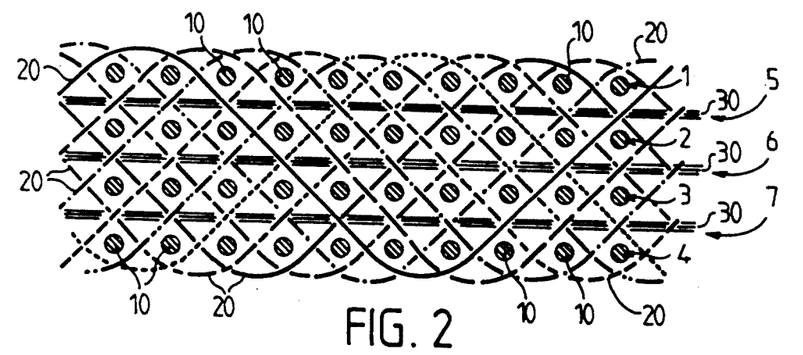
FIG. 2 is a schematic view in cross-section according to the warp yarns of a second example of a textile structure according to the invention.

FIG. 2 shows a textile structure comprising a stack of layers of yarns which is substantially identical to that of the textile structure represented in FIG. 1.

The tying yarns 20 which connect the layers of the stack are in this case arranged according to a method of the 8/2 twill type.

Figure 3:
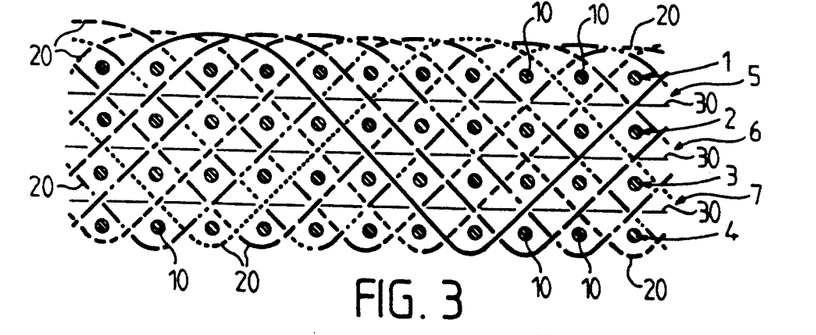
FIG. 3 is a schematic view in cross-section according to the warp yarns of a third example of a textile structure according to the invention.

FIG. 3 represents a textile structure composed of a stack of layers of yarns which is substantially identical to that of the textile structure in FIG. 1.

The tying yarns 20 are in this case arranged according to a method of the asymmetrical composed twill type: 7/3 on the upper layer 1 of weft yarns and 9/1 on the lower layer 4 of weft yarns.

Figure 4:
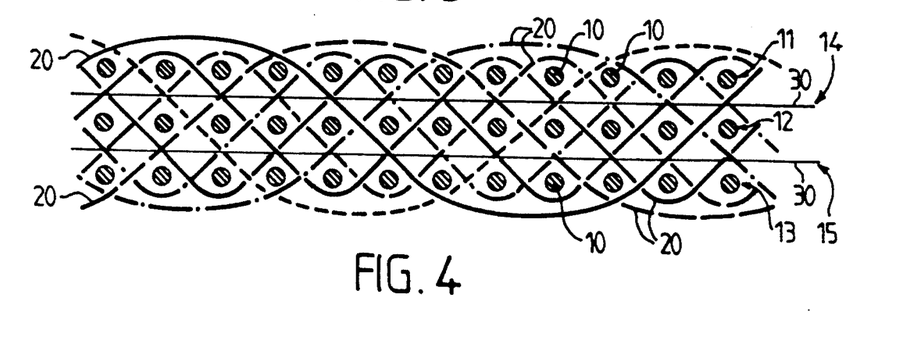
FIG. 4 is a schematic view in cross-section according to the warp yarns of a fourth example of a textile structure according to the invention.

FIG. 4 shows a textile structure comprising three layers 11 to 13 of weft yarns 10 and two layers 14 and 15 of warp yarns 30 which are arranged alternately and have the same characteristics as those described with reference to FIG. 1.

The layers of the stack are connected by tying yarns 20 arranged according to a method of the symmetrical composed twill type: 8/4 and 5/1.

Figure 5:
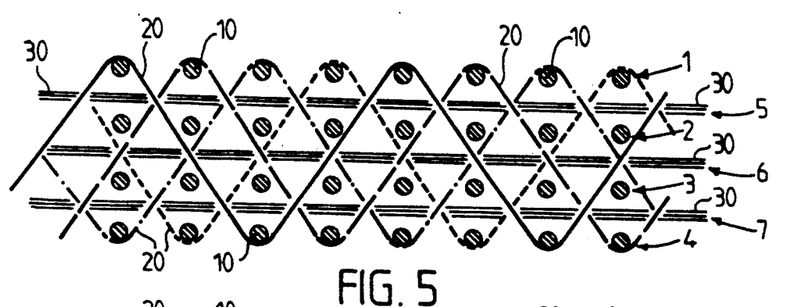
FIG. 5 is a schematic view in cross-section according to the warp yarns of a fifth example of a textile structure according to the invention.

With reference to FIG. 5, the textile structure is composed of a stack of layers of yarns which is substantially identical to that of the textile structure in FIG. 1.

The tying yarns 20 are in this case oriented so as to have a great angle with the layers of the stack. This angle is in this case close to 90°. The method of tying represented is of the 5/1 twill type.

It can be noted that the tying yarns can have an angle of close to 90° with the layers of the stack inasmuch as they do not tie successively all the yarns of the rows perpendicular to the plane of the layers. Thus, a textile structure of which the tying yarns are arranged according to a method of the 3/2 twill type corresponds to the invention.

Figure 6:
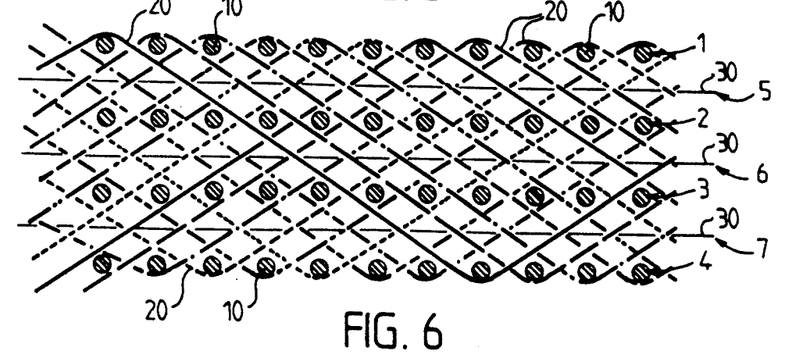
FIG. 6 is a schematic view in cross-section according to the warp yarns of a sixth example of a textile structure according to the invention.

The textile structure represented in FIG. 6 comprises a stack of layers of weft yarns 10 and of warp yarns 30 which is substantially identical to that in FIG. 1.

The tying yarns are oriented so as to have a relatively small angle with the layers of the stack. The method of tying represented is of the 10/1 twill type.

It can be noted that it is not necessary that the arrangement of the layers leads to a distribution of the yarns in the same direction according to substantially superposed rows, perpendicular to the plane of the layers. This in fact has no effect on the functions which are fulfilled by the textile structure according to the invention or on its mechanical properties. In any case, when a structure is draped over a piece, the layers of yarns which constitute it slide in relation to one another.

Thus, the invention is not limited to a distribution of the yarns in the same direction according to substantially superposed rows.

Figure 7:
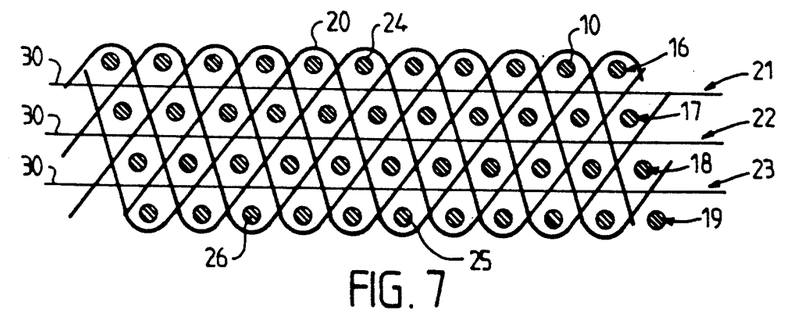
FIG. 7 is a schematic view in cross-section according to the warp yarns of a seventh example of a textile structure according to the invention.

For example, FIG. 7 shows a textile structure according to the invention comprising, like that illustrated in FIG. 1, four layers 16 to 19 of weft yarns 10 and three layers 21 to 23 of warp yarns 30, arranged alternately, the yarns all having the same direction within one and the same layer.

It can be noted that the layers are arranged in such a manner that the direction of one layer is crossed in relation to that of the adjacent layers. In this example, the directions of two adjacent layers are essentially at 90° from one another.

The layers are arranged in such a manner that the yarns of the layers of the same nature (warp or weft) are not superposed but offset in relation to one another.

The stacked layers of the textile structure are tied by tying yarns 20. The method of tying is of the 4/1 twill type. It can be noted that each tying yarn ties, between two passages on the lower layer 19, for example, a set of yarns of layers which are parallel to one another. One of these sets is defined by a first yarn of a first layer, for example the yarn 24 of the layer 16, a second yarn of a second layer, for example the yarn 25 of the layer 19, and a third yarn of a third layer, for example the yarn 26 of the layer 19. The second and third yarns 25, 26 are offset in relation to the first yarn 24.

It is necessary, on the other hand, that the textile structure comprises at least three superposed layers of yarns. It is observed in fact that a textile structure composed of only two layers deforms much less well.

In these different examples of textile structure according to the invention, the tying rate is comprised between 2 and 15% approximately. It is a necessary condition in order that the fabric be deformable while being adequately held together by the tying yarns.

The invention and the advantages which it affords in relation to the known textile structures will be demonstrated further by comparisons carried out with regard to the mechanical performances and the drapability of textile structures obtained according to the known techniques and according to the invention.

As far as the mechanical performances are concerned, the comparison will be carried out between three textile structures: the first, designated henceforward as structure (1), corresponds to the invention; the second, designated henceforward as structure (2), is a fabric of the twill type, and the third, designated henceforward as structure (3), is a fabric of the tridirectional type.

Textile structure (1) was made so as to have the following characteristics:

Weave: textile structure made according to the fourth example for making the textile structure according to the invention, described with reference to FIG. 4.
Nature of yarn:
  warp: silionne 300 tex
  tying yarn: silionne 34 tex
  weft: roving 160 tex.
Surface mass: 600 g/m² approximately.
Contexture:
  warp: 9.6 yarns/cm
  tying yarn: 4.8 yarns/cm
  weft: 18.5 shots/cm.
Mass distribution:
  warp: 48%
  tying yarn: 3%
  weft: 49%.

Textile structure (2) was woven so as to have the following characteristics:
Weave: 2 ties 2 twill.
Nature of yarn:
  warp: 3 parallel yarns of silionne 68 tex
  weft: 3 parallel yarns of silionne 68 tex.
Surface mass: 295 g/m² approximately.
Contexture:
  warp: 7 yarns/cm approximately
  weft: 7 shots/cm approximately.
Mass distribution:
  warp: 50%
  weft: 50%.

Such a structure does not strictly comprise tying yarns. It is the weft and warp yarns which play the role of tying yarns. In order to be able to compare this textile structure to textile structure (1), it can be estimated that the "equivalent tying rate" is approximately 50%.

Figure 8:
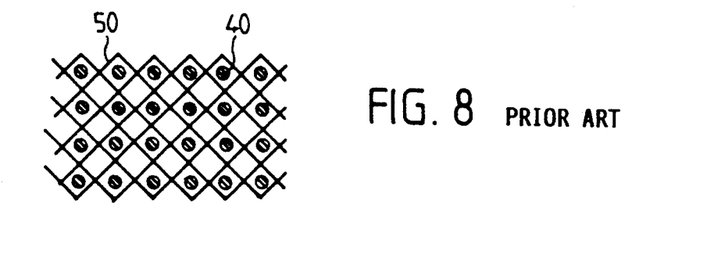
FIG. 8 illustrates an example of a known structure known as "tridirectional"

Lastly, textile structure (3) has the following characteristics:

Weave: textile structure made according to FIG. 8, in which the weft yarns have the reference 40 and the warp yarns the reference 50.

The warp yarns 50 are undulating perpendicularly to the plane of the weft yarns 40.
Nature of yarn:
  warp: silionne 300 tex
  weft: silionne 300 tex.
Surface mass: 1045 g/m² approximately.
Contexture:
  warp: 16.2 yarns/cm
  weft: 16.2 shots/cm.
Mass distribution:
  warp: 50%
  weft: 50%.

As for textile structure (2), textile structure (3) does not comprise tying yarns. It is the warp yarns which carry out the tying. It is for this reason that in this case too an "equivalent tying rate" which is 50% can be defined.

The tests were carried out according to IGC standards. These standards correspond globally to ISO standards, the conditions fixed in the ISO standards being within those fixed in the IGC standards. The correspondence which can be established with these reserves will be indicated in each case.

All these tests were carried out, according to the standards below, on flat test-pieces, of a thickness of 3 mm approximately, of textile structures (1), (2) and (3), comprising a fiber volume rate, that is to say the ratio of volume of fibers of the textile structure to volume of composite, of 52% and after use of the epoxy resin LY 564-1/HY 2954 of Ciba Geigy.

The above epoxy resin has the following conditions of use:
polymerization: 1 hour at 110° C. in the mold,
post-curing out of mold: 4 hours at 145° C.

In order to obtain this fiber volume rate of 52% for the textile structures (1), (2) and (3), it was necessary to make the following stacks:
for textile structure (1): stack of 7 plies.
for textile structure (2): stack of 14 plies.
for textile structure (3): stack of 4 plies.

Lastly, all these tests were carried out in the warp direction.

They made it possible to determine:
shear stress at breaking, according to Standard IGC 04 26 235 (ISO 4585),
the modulus in bending and the bending stress at breaking, according to Standard IGC 04 26 245 (ISO 178),
the modulus in tension and the tensile stress at breaking according to Standard IGC 04 26 250 (ISO 3268, 527, 9163).

The results obtained are as follows:

| Textile structure Tests | (1) | (2) | (3) |
|---|---|---|---|
| SHEARING | | | |
| Stress | 53 MPa | 51 MPa | 39 MPa |
| BENDING | | | |
| Modulus | 22,400 MPa | 21,300 MPa | 14,800 MPa |
| Stress | 690 MPa | 640 MPa | 310 MPa |
| TENSION | | | |
| Modulus | 20,500 MPa | 17,500 MPa | 16,500 MPa |
| Stress | 520 MPa | 420 MPa | 400 MPa |

These results reveal that textile structure (1) according to the invention has mechanical properties which are very considerably superior to those of the tridirectional textile structure (3) and substantially superior to those of textile structure (2), above all as far as tension is concerned.

These tests with regard to mechanical properties were supplemented by tests with regard to drapability, so as to reveal that the textile structure according to the invention, in contrast to known textile structures, has at the same time good mechanical performances and a high aptitude for deformation.

The notion of drapability or even conformability is not defined in a precise manner in the area of composite materials. It will be understood here as the capacity of a fabric to follow a shape which has curvature in more than two directions, on the understanding that a force may possibly be exerted upon the positioning of the fabric.

This test is, conventionally, carried out on a hemispherical shape of a diameter of 100 mm. The measure of the drapability is given by the height of the spherical cap which the fabric can follow without forming creases or undulating.

Tests of this type already carried out have shown that all known fabrics have a drapability which is lower than the height of the spherical half-cap. They have furthermore shown that the drapability capacity of fabrics is, in increasing order, as follows: fabric of taffeta weave, fabric of twill weave, fabric of satin weave, fabric of tridirectional type.

More specifically, the results of such tests have, for example, been reported in the article by M. P. LISSAC, published in the review COMPOSITES, No. 3, May-- June 1985. These tests were carried out on fabrics of taffeta weave and of satin weave.

The best result was obtained for a fabric of a satin weave of 8 and of a surface mass equal to 500 g/m$^2$. It was possible to confirm that for this fabric the height of the spherical cap which it is possible to drape is comprised between 40 and 50 mm. It is approximately 40 mm for a fabric of the same weave and of a surface mass equal to 600 g/m$^2$ like textile structure (1).

This test was carried out for a textile structure according to the invention and identical to textile structure (1) described above.

It was observed that textile structure (1) has a drapability which exceeds the limits of this test since it easily follows the hemisphere over its entire height.

It therefore appears that the textile structure according to the invention has a drapability which is superior to that of a fabric of a satin weave of 8, for an identical surface mass.

It therefore seemed of interest to evaluate the limit from which textile structure (1) forms creases. To do this, the hemisphere of a diameter of 100 mm was prolonged by a cylinder of the same diameter. It was observed that the first creases appear at a cylinder height greater than 50 mm.

Figure 9:
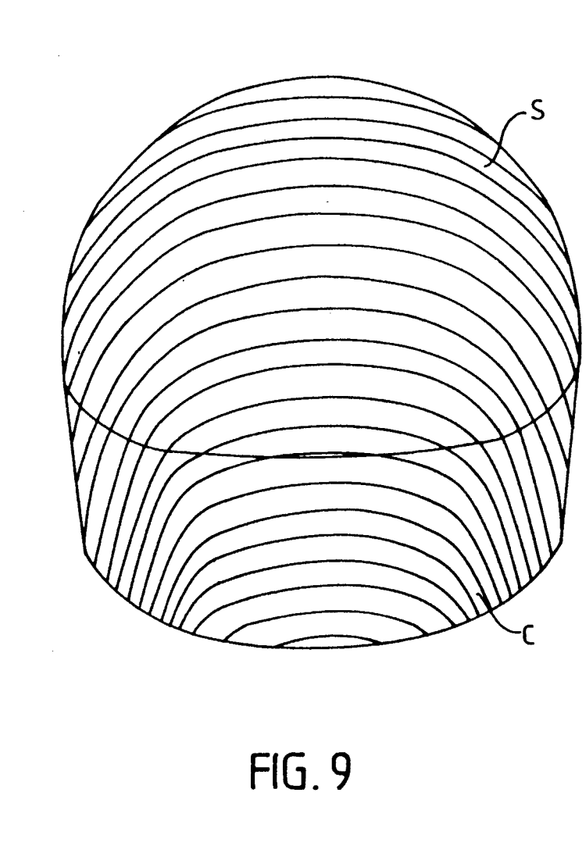
FIG. 9 is a view from above of a fabric according to the invention draped over a first piece of a particular shape.

FIG. 9 represents a view from above of a textile structure, which corresponds to textile structure (1), draped over a shape constituted by a cylinder C of a diameter of 100 mm and a height of 50 mm, surmounted by a hemisphere S of a diameter of 100 mm. The curved lines represent one warp line out of ten and do not have irregularities revealing creases or undulations.

Figure 10:
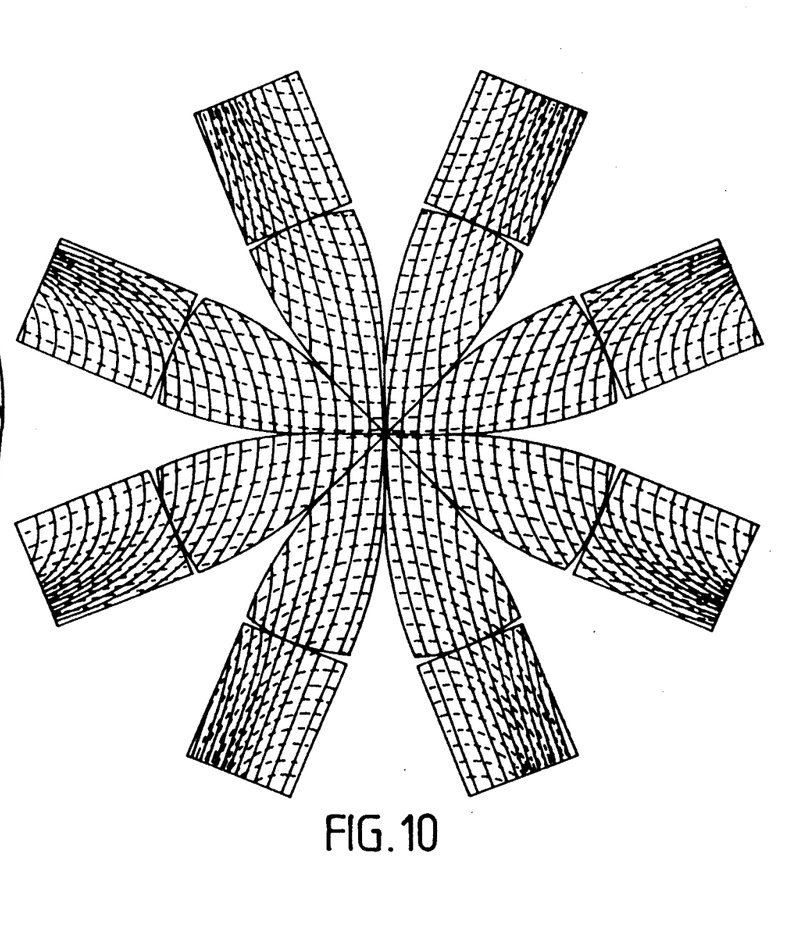
FIG. 10 is a developed view of the fabric in FIG. 9.

FIG. 10 represents a developed view of the textile structure in FIG. 9. The continuous lines represent 1 warp yarn out of 10, the discontinuous lines represent 1 weft yarn out of 10. This figure makes it possible to represent better the whole of this piece and gives the orientations of the fibers and the relative local variations of their spacing.

This figure reveals that the fiber content is essentially constant over the entire spherical cap as well as in the upper part of the cylinder. The fiber content is no longer homogeneous in the rest of the cylinder.

It must be noted that the homogeneity of the fiber content must be appreciated by comparing that which can be obtained by the textile structure according to the invention and by known textile structures. The test carried out on the shape composed of a hemisphere prolonged by a cylinder makes it possible to demonstrate the limits of the textile structure according to the invention but above all to shows that these limits are situated well beyond those of known textile structures, since the latter form creases and therefore a fortiori do not have a constant fiber content over the spherical cap.

Figure 11:
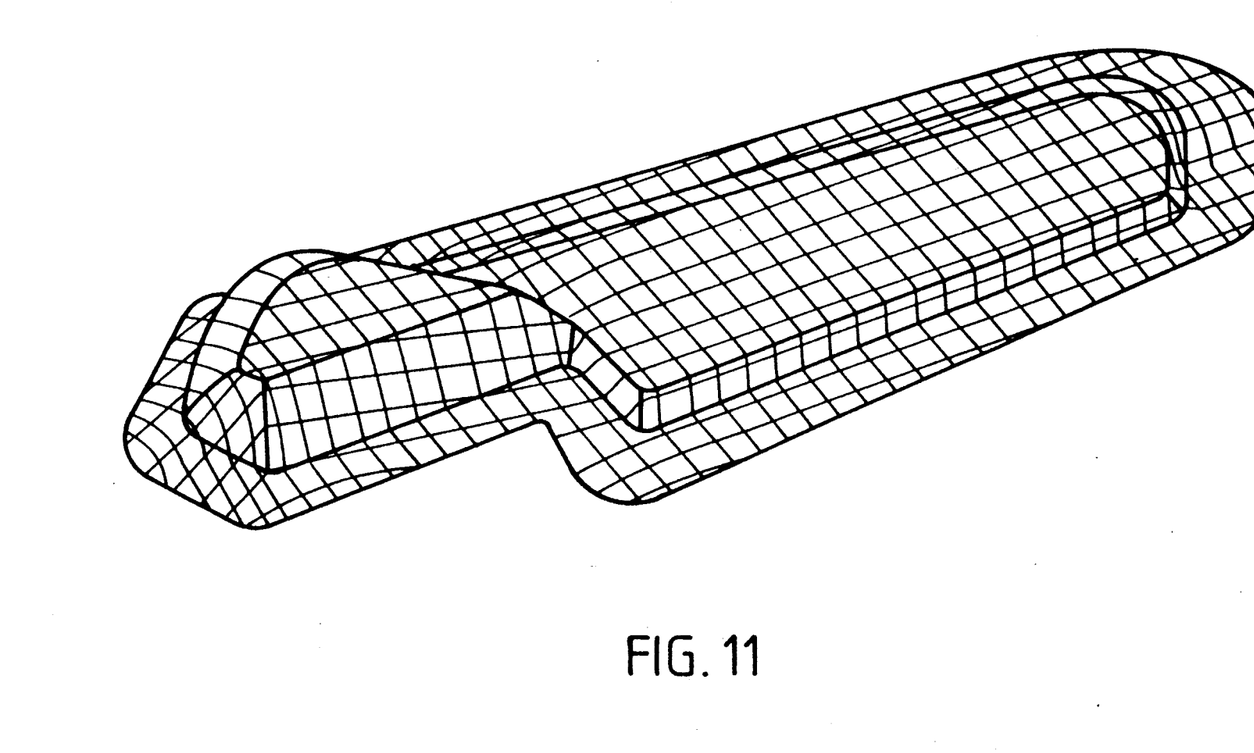
FIG. 11 is a view from above of a fabric according to the invention draped over a second piece of particular shape.

An example of the use of the textile structure according to the invention is illustrated by FIG. 11. The lines represent one warp or weft yarn out of ten. It can be observed that on this piece, of complex shape, no crease appears and the fiber content is essentially constant over the entire piece. The textile structure used is textile structure (1).

In contrast, it is not possible to drape over this piece a fabric such as textile structures (2) or (3), defined above, without creases forming.

It appears that the homogeneity of the fiber content within a fabric draped over a given piece is connected to the depth of this piece. Thus, for example, the fiber content is substantially constant for the piece illustrated in FIG. 11, which is relatively shallow, whereas it is no longer homogeneous in the piece in FIG. 9, which is relatively deep.

The textile structure which has just been described can also be used after having been impregnated with, in particular thermosetting resin.

It can be noted that it is, moreover suitable for making composite articles, in particular on a resin base with textile reinforcement. These articles can be obtained, for example, by means of injection-molding processes. The most commonly used resins in this type of application are in particular epoxy, phenolic, acrylic, bis-maleimide, polyester and other resins.

I claim:

1. A textile structure, comprising:
   at least three unidirectional layers of yarns that are superposed in directions crossing each other; and
   tying yarns tying said plurality of unidirectional layers of yarns at a tying between 2 and approximately;
   wherein each said tying yarn ties at least one set of yarns of said superposed layers, a said set being defined by at least a first yarn of a first said layer and a second yarn of a second said layer, said first and second yarns being offset in relation to each other; and
   wherein said tying yarns are tied sufficiently loose to allow said superposed layers to deform while maintaining said superposed layers in position.

2. The textile structure of claim 1, wherein said yarns of said superposed layers that extend in the same direction are arranged in superposed rows, each said tying yarn tying at least certain said yarns of one said row while also tying at least certain said yarns of at least one adjacent said row.

3. The textile structure of claim 1, wherein said superposed layers of yarns are parallel with one another.

4. The textile structure of claim 3, wherein said yarns of one said layer form an angle of 90° with said yarns of an adjacent said layer.

5. The textile structure of claim 1, wherein said unidirectional layers of yarns are made of metal, glass, carbon, silicon carbide, boron or aramid.

6. The textile structure of claim 1, wherein said yarns of said layers are all made of the same material.

7. The textile structure of claim 1, wherein different said yarns of said layers are made of different materials.

8. The textile structure of claim 1, wherein each said layer is homogeneous or hybrid.

9. The textile structure of claim 1, wherein the diameter of said tying yarns is smaller than the diameter of said yarns of said superimposed layers.

10. The textile structure of claim 1, wherein said tying yarns are made of fiber.

11. The textile structure of claim 1, wherein said tying yarns are made of a material that can be melted under heat.

12. The textile structure of claim 1, wherein said tying yarns are made of a thermoplastic material.

13. The textile structure of claim 1, wherein said yarns of said layers are made of a thermoplastic material.

14. The textile structure of claim 1, wherein said superimposed layers are impregnated with a thermosetting resin.

15. A textile structure, comprising:
    a plurality of superimposed layers of yarns, wherein each said layer, having its said yarns all extending in the same direction, crosses the direction of the said yarns of each adjacent said layer, said plurality of superimposed layers of yarns continuously alternates between a layer of weft yarns and a layer of warp yarns from the top layer thereof to the bottom layer, and said plurality of superimposed layers totalling at least three said layers; and
    a plurality of tying yarns tying said plurality of superimposed layers of yarns together at a tying rate of 2 to approximately, each said tying yarn tying at least one set of yarns, wherein a said set of yarns is defined by at least a first yarn of a first weft layer and a second yarn of a second weft layer, said first and second yarns being offset relative to each other, and wherein said tying yarns are tied sufficiently loose to allow said superposed layers to deform while maintaining said superposed layers in position.

16. The textile structure of claim 15, wherein each of said yarns in the same said superimposed layer lie parallel to each other.

17. The textile structure of claim 16, wherein said tying yarns extend through each said superimposed layer.

18. The textile structure of claim 15, wherein said tying yarns tie said yarns of said superimposed layers in a 7/1 twill arrangement.

19. The textile structure of claim 15, wherein said tying yarns tie said yarns of said superimposed layers in an 8/2 twill arrangement.

20. The textile structure of claim 15, wherein said tying yarns tie said yarns of said superimposed layers in an asymmetrical composed twill 7/3 and 9/1 arrangement.

21. The textile structure of claim 15, wherein said tying yarns tie said yarns of said superimposed layers in an asymmetrical composed twill 8/4 and 5/1 arrangement.

22. The textile structure of claim 15, wherein said tying yarns tie said yarns of said superimposed layers in a 10/1 twill arrangement.

23. The textile structure of claim 15, wherein said yarns each said weft layer are offset relative to said yarns of the other said weft layers.

24. The textile structure of claim 15, wherein said superimposed layers are impregnated with a thermosetting resin.

25. A composite article comprising a resin base reinforced by a textile structure, said textile structure comprising at least three unidirectional layers of yarns that are superposed in directions crossing each other, and tying yarns tying said plurality of unidirectional layers of yarns at a tying rate between 2 and approximately, wherein each said tying yarn ties at least one set of yarns of said superposed layers, a said set being defined by at least a first yarn of a first said layer and a second yarn of a second said layer, said first and second yarns being offset in relation to each other, and wherein said tying yarns are tied sufficiently loose to allow said superposed layers to deform while maintaining said superposed layers in position.

* * * * *